United States Patent
Naghian et al.

(10) Patent No.: US 7,457,623 B2
(45) Date of Patent: Nov. 25, 2008

(54) HANDOVER IN CELLULAR COMMUNICATION SYSTEM

(75) Inventors: Siamäk Naghian, Espoo (FI); Risto Aalto, Riihimäki (FI)

(73) Assignee: Nokia Corporation, Espoo (FI)

(*) Notice: Subject to any disclaimer, the term of this patent is extended or adjusted under 35 U.S.C. 154(b) by 362 days.

(21) Appl. No.: 10/717,634

(22) Filed: Nov. 21, 2003

(65) Prior Publication Data

US 2004/0102194 A1    May 27, 2004

Related U.S. Application Data

(63) Continuation of application No. PCT/FI02/00449, filed on May 24, 2002.

(30) Foreign Application Priority Data

May 25, 2001    (FI)    ................................. 20011098

(51) Int. Cl.
    *H04Q 7/20*    (2006.01)
(52) U.S. Cl. ........................ 455/439; 455/436; 455/442; 370/331; 370/332
(58) Field of Classification Search ................. 455/439, 455/436, 442, 446; 370/332, 331, 252, 468
    See application file for complete search history.

(56) References Cited

U.S. PATENT DOCUMENTS

| | | | |
|---|---|---|---|
| 5,940,762 A | 8/1999 | Lee et al. | |
| 6,148,209 A | 11/2000 | Hamalainen et al. | |
| 6,584,116 B1 * | 6/2003 | Gourgue et al. | 370/442 |
| 6,603,748 B1 | 8/2003 | Lu et al. | |
| 6,665,538 B1 * | 12/2003 | Hunte | 455/446 |
| 6,728,217 B1 * | 4/2004 | Amirijoo et al. | 370/252 |
| 6,792,283 B1 * | 9/2004 | Roberts et al. | 455/525 |
| 6,889,050 B1 * | 5/2005 | Willars et al. | 455/452.2 |
| 6,907,244 B2 * | 6/2005 | Santhoff et al. | 455/442 |
| 2002/0012385 A1 | 1/2002 | Yun et al. | |
| 2003/0189912 A1 * | 10/2003 | Laitinen et al. | 370/338 |

FOREIGN PATENT DOCUMENTS

WO    WO 99/51052    10/1999

* cited by examiner

*Primary Examiner*—Danh C Le
(74) *Attorney, Agent, or Firm*—Squire, Sanders & Dempsey L.L.P.

(57) ABSTRACT

A method for deciding on handover in a cellular communication system and a cellular communication system comprising cells (A, B, C, D) and a mobile station (MS1, MS2, MS3) having a connection to at least a first cell providing a certain data transfer rate i.e. a bit rate to the mobile station, wherein the system is arranged to collect bit rate information related to the mobile station and use the bit rate information for deciding on handover of the mobile station from the first cell to a second cell.

42 Claims, 2 Drawing Sheets

HANDOVER IN CELLULAR COMMUNICATION SYSTEM

This is a Continuation of International Application No. PCT/FI02/00449 filed May 24, 2002, which designated the U.S. and was published under PCT Article 21(2) in English.

FIELD OF THE INVENTION

The present invention relates to a method and an apparatus for performing a handover procedure of a mobile station in a cellular communication system.

BACKGROUND OF THE INVENTION

Maintaining a traffic connection of a moving subscriber is made possible by means of handover function. The basic concept of handover is simple: when a mobile station (such as a mobile phone, a wireless Internet device, a portable device, a personal digital assistant, etc.) of the subscriber moves in a cellular communication system from one cell of the system to another, a new connection with the new cell has to be set up and the connection with the old cell has to be released.

Depending on the diversity used the handover mechanisms can be categorized as hard handover, soft handover and softer handover. A simultaneous soft and softer handover process is called soft-softer handover. All these are typically provided by the third generation (3G) mobile systems.

Another way to categorize various handover types is based on system architecture, meaning the network elements between which handover signalling is executed. For instance, if handover is executed between two base stations then it is called inter-base station handover. Based on this criterion, intra-base station, inter-base station, intra-radio access controller, inter-radio access controller and inter core network handover can also be defined, for example. Further examples are intra-frequency handover, which is executed between different layers of the same network or neighbouring cells, inter-frequency handover, which is executed between different cells or layers of the same network or different networks/network types, and intersystem handover, which is executed between cells or layers of different network types, for example IP RAN (IP Radio Access Network), UTRAN (UMTS Radio Access Network) and GSM. IP RAN is an access network which utilizes IP transport. IP transport may be utilized on top of different kind of radio access techniques (multiradio).

On the other hand, depending on the reason on the basis of which the handover decision is made, the handover types can be categorized as traffic reason handovers, quality based handovers, speed based handovers, and so on.

Both second (a second generation system like the GSM will support high rate data traffic in its next phases e.g. with EDGE evolution) and third generation cellular systems provide a remarkable increase in the data bit rate i.e. the transfer rate with which data is transmitted over an air interface. As a result, it can be foreseen that databased services provided to an end user will form a vital part of cellular technology and business in the near future. It is commonly understood that databased services will play a dominant part in the cellular system environments in comparison to real time services such as voice. As a potential business factor, databased services with different Quality of Services (QoS) also set new technical requirements to the cellular systems supporting data communication.

In a real cellular environment the user density and the data bit rate requested by the users are two crucial factors when efficiently planning the cellular system. However, these are some of the most difficult factors to be estimated or controlled, requiring continuous adaptation of the network to the on demand traffic. In case of databased services, it is not enough to adapt the network resources only by means of initial network replanning. Moreover, the nature of the databased services requires more flexibility from other mechanisms like the handover mechanism supported in a cellular system for utilizing the optimized resources to meet the appropriate quality of services.

Although conventional handover mechanisms may be necessary to be supported, they do not always provide means to achieve an optimum performance in the databased service environment.

BRIEF DESCRIPTION OF THE INVENTION

An object of the present invention is thus to provide a method and an apparatus for implementing the method so as to overcome the above problems or at least to alleviate them. The objects of the invention are achieved by a method, a cellular communication system and a system element, which are characterized by what is stated in the independent claims 1, 14 and 27. The preferred embodiments of the invention are disclosed in the dependent claims.

The invention is based on the idea of using the data transfer rate i.e. the bit rate of the connection, comprising existing and/or requested connections, as a basis for the decision when deciding on handover of a mobile station from one cell to another.

An advantage of the invention is that the burstyness of a packet switched cellular system can be taken into account in handover situations. The invention can be used for balancing inter-cell load and therefore to have an impact on the stability of the radio system. It makes it possible to split reasonably multicast connections in order to distribute the traffic load more uniformly. It can help to decrease undesired signalling load due to traditional handover mechanisms. It may also decrease the amount of measurement reports over e.g. air, Iub, and Iur interfaces in third generation systems. The bit rate information can be extracted in connection with an upper layer operation (along with radio access bearer information). Therefore handover can be performed in a pre-emptive way in order to improve the system performance.

BRIEF DESCRIPTION OF THE DRAWINGS

In the following the invention will be described in greater detail by means of the preferred embodiments with reference to the accompanying drawings, in which.

DETAILED DESCRIPTION OF THE INVENTION

Figure 1:
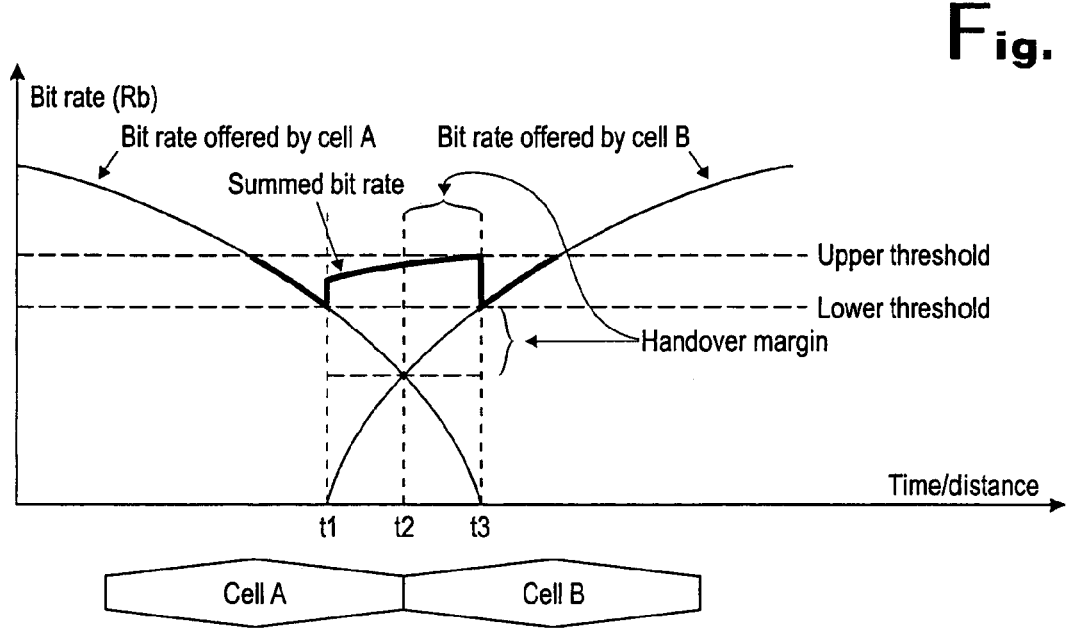
FIG. 1 illustrates an embodiment of the invention.

The basic idea of the invention is to use bit rate information when deciding on handover in a cellular communication system. The bit rate information refers, for example, to the bit rate provided to a mobile station (MS) by a cell in the system when the mobile station has a connection to the cell, a bit rate provided to the mobile station by at least one other cell (to which the mobile station does not necessarily have a connection) or a bit rate requested by the mobile station. Preferably the bit rate is throughput rate. The decision on handover may in turn comprise deciding on whether handover should be made, deciding on to which cell the mobile station handover should be made or deciding on when handover should be made, for example. In the following, a handover mechanism using bit rate information according to the invention is referred to as a bit rate sensitive handover or BSH.

The BSH enables cellular operators or service providers to define different handover profiles for different bit rate classes. According to one preferred embodiment of the invention a handover profile is defined such that the profile defines preferable cell(s) for each bit rate. The bit rate classes are preferably categorized according to the traffic classes specified for Radio Access Bearers. The handover profile may define the advisable target cell within different systems, for example GSM, WCDMA (Wide-band Code Division Multiple Access), etc. in a multilayered cell structure, based on the bit rates of the connections. The following table exemplifies the bit rate classification for handover decision-making purposes in the BSH handover approach. This classification can be done, for example, on the basis of Radio Access Bearer IDs requested by the mobile station, Transport Format Set Combination information structured on the basis of the requested RABs, and so on. The handover profile may also contain a location information category, for instance, the distance between the base station and the mobile station.

| Bit rate | Handover profile |
| --- | --- |
| 16 kbps | Cells/capacity shared for circuit switched domain (1) |
| 32 kbps | Cells/capacity shared for low speed interactive data (2) |
| 64 kbps | Cells/capacity shared for intermediate interactive data (3) |
| 128 kbps | Cells/capacity shared for high speed interactive data (4) |
| 256 kbps | Cells/capacity shared for large scale interactive data (5) |
| Rn . . . Rn + 1 | Cells/capacity shared for hyper data bit rate services |

FIG. 1 illustrates an example of the implementation of the invention according to an embodiment. In order to prevent the so-called "ping-ponging" effect, which refers to a phenomenon, in which the mobile station located close to the border between two cells wildly switches back and forth between the cells and which is tricky for any type of handover, a bit rate handover margin can be used. As is shown in the figure, when a mobile station is moving (along the time/distance axis) from cell A towards cell B, the bit rate provided by cell A decreases and the bit rate provided by cell B increases. A handover margin (dH) can be dynamically defined on the basis of the variation of the bit rate provided by the neighbouring cells A and B as well as the handover profiles, for example. This means taking into account how fast (or to what degree of bit rate) the coverage of cell A is weakened and the coverage of the neighbouring cell (cell B) is strengthened at the cell boundary. In the figure an upper threshold is set at a level that the summed bit rate of cells A and B (or a signal cell bit rate) should not exceed. Otherwise, it may cause interference to the system. A lower threshold is a level at which the bit rate provided by cell A is at a minimum acceptable level. A handover margin is an interval during which the bit rate provided by cell B exceeds the bit rate from the serving cell (cell A) by a certain amount and/or for a certain time, for example, the time between t2 and t3 in FIG. 1.

Handover (branch addition) may occur in the time interval, during which the bit rate of the serving cell A is at its minimum acceptable level (t1). On the other hand, as is shown in the figure, at this point (t1) the bit rate provided by cell B is good enough to be measured and added to the bit rate provided by cell A. This is preferably done when soft/softer handover is used. At t3 on the other hand, the summed bit rate is close to the upper threshold, and if it exceeds the threshold it may cause undesirable interference to the system, and hence the signal of cell A (in terms of bit rate) is removed (branch deletion). In case of hard handover, and if the handover margin is used the signal (bit rate) of the cell A is preferably totally replaced by the signal (bit rate) of the cell B at the interval between t2 and t3.

It is also possible to use other kinds of preconditions instead of the above described margin when deciding on when to perform handover. For example, it can be set that handover is performed when the bit rate provided by the first cell and/or the bit rate provided by the second cell is lower than a predetermined limit value, is higher than a predetermined limit value or is between two predetermined limit values.

It should be mentioned that cell A and cell B in the above examples can belong to either the same radio access system or to two different systems, like the GSM and WCDMA, without having any significance to the basic idea of the invention.

Figure 2:
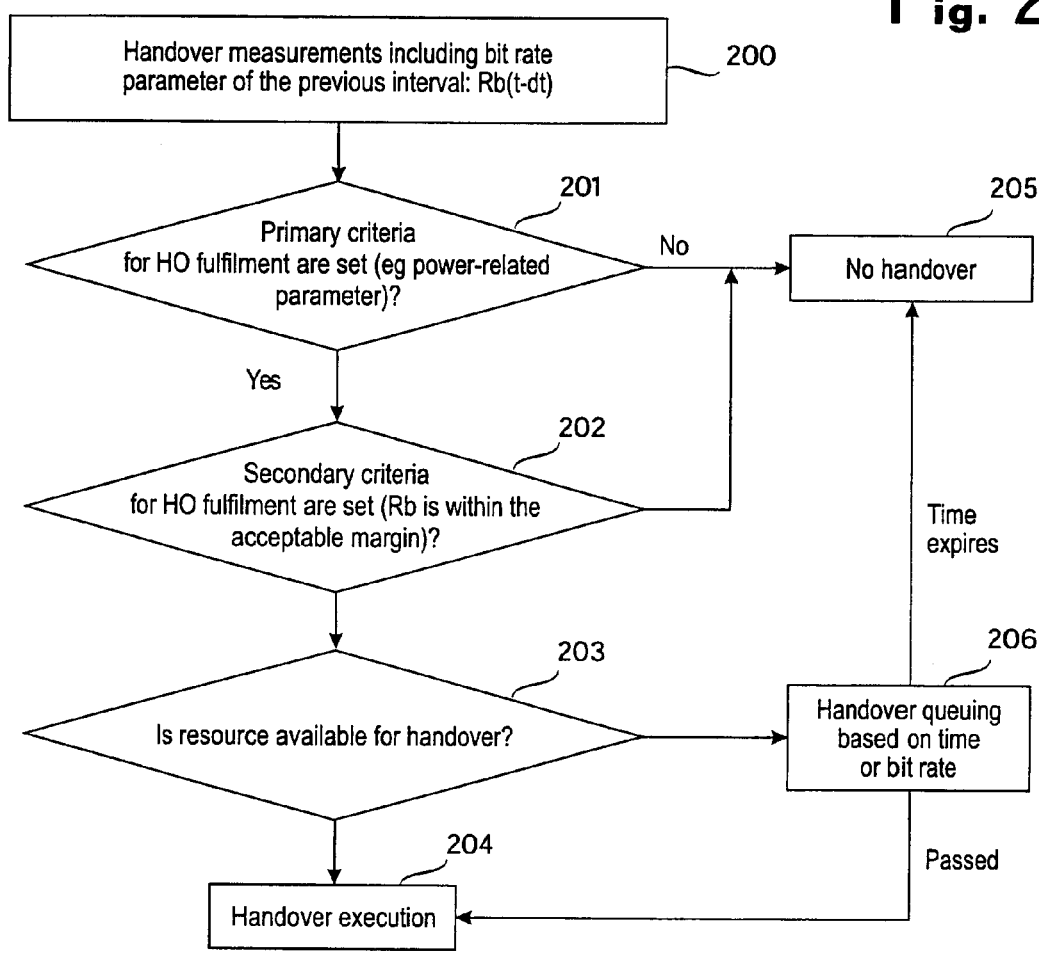
FIG. 2 is a flow chart showing the handover procedure according to an embodiment of the invention.

FIG. 2 illustrates a flow chart of the handover procedure according to an embodiment of the invention. In step 200 the handover measurements, including bit rate parameters, which describe the bit rate(s) used in deciding on handover as described above, within a specific time interval are collected and preferably stored. The bit rate criterion, i.e. the use of bit rate information on a handover situation, may be combined with other basic criteria used in an earlier phase of the handover decision-making procedure. Such criteria can be, for example, mobile station location information, mobile station speed, type of connection (real time, non real time, multicast, etc.). From these, location assistance data is most likely useful information for this purpose. In case of a multicast connection (simultaneous real time, non real time, etc.), the bit rate criterion may also be used in order to split the load between the neighbouring cells. This means that a radio resource may be allocated from different cells or network layers to support different services included in one or more connections. The different network layers mentioned above can be different layers of the same network, such as macro and micro layers of the network, or layers of different radio access networks, such as GSM/EDGE, WCDMA or WLAN. In step 201 it is checked whether the possible first criteria, which may contain, for example, a signal strength threshold for both transmitted power and received power in a cell, are met. The threshold may be indicated as a percentage value, for example. The first criteria typically belong to the handover control parameters, which are defined on a cell-by-cell basis by attaching a specified parameter set for a specified cell. In the case of FIG. 1 the first criterion could be, for example, that the signal strength (power) provided by cell B exceeds the signal strength provided by cell A by a certain amount, for example 2 dB. If the first criteria are not met then no handover is performed in step 205. Otherwise the procedure proceeds to step 202. In step 202 it is checked whether the second criteria, i.e. the bit rate criteria, are met. The bit rate criterion is preferably the main and final criterion and may be utilized as the target criterion in order for the handover entity to make the handover decision and trigger the handover execution. In the case of FIG. 1 the second criterion could be, for example, that the bit rate provided by cell B exceeds the bit rate provided by cell A by a certain amount, for example 20 kbps. If the second criteria are not met then no handover is performed in step 205. Otherwise the procedure proceeds to step 203. In step 203 it is checked whether the selected resource is available for handover to take place. If it is, handover is executed in step 204. If it is not the procedure proceeds to step 206. In step 206 the resource is queued on the basis of the elapsed time or the available bit rate, for example. If the time expires, no handover is performed in step 205. If queueing is passed, handover is executed in step 204.

Figure 3:
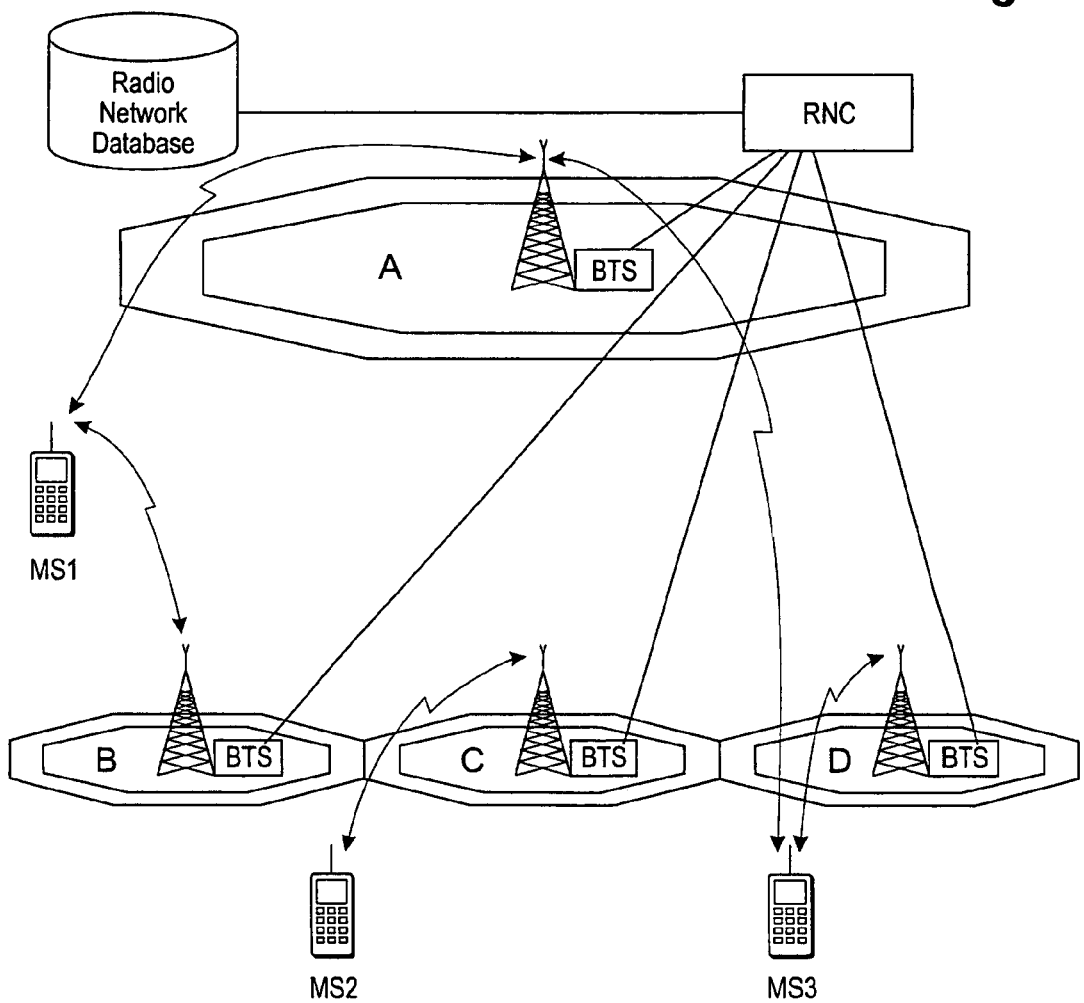
FIG. 3 illustrates examples of the use of the handover procedure according to an embodiment of the invention and FIG. 4 is a signalling diagram showing the handover procedure according to an embodiment of the invention.

The BSH can be utilized in different situations and different systems in order to improve the overall performance of radio resource management in cellular systems. FIG. 3 illustrates some examples of the BSH utilization according to the embodiments of the invention. The system of FIG. 3 comprises cells A, B, C and D provided by base stations (BTS) and controlled by a radio network controller (RNC). A radio network database connected to the RNC is also illustrated. It should be noted that the figure illustrates only the elements necessary for understanding the invention and the structure of the system may vary from what has been shown, which does not affect the basic idea of the invention. Let us assume that a low speed mobile station MS1 requesting a high bit rate is located at the border of a macro cell (A) either at the time of requesting a radio connection or when MS1 already has a radio connection with the radio network. Because it is reasonable to keep the high bit rate mobile stations within the micro cells then it may be decided to hand MS1 over from the macro cell to the underlying neighbouring micro cell (B). The reason for such handover may be either the fact that the requested high bit rate connection can not be supported via the macro cell or the speed of MS1 is low enough to keep it at the micro cell which can offer better Quality of Service in terms of bit rate. Therefore, from the system performance and QoS viewpoint it is more sensible to keep the radio connection of a mobile with low speed and high bit rate at the micro cell level. Moreover, this type of handover can be utilized in order to balance the inter-cell traffic, signalling load and undesired interference, leading to system stability and better performance.

As another example, let us assume that a mobile station MS3 with a high bit rate connection (including the requested connection) is camping at the micro cell D. It is further assumed that the high bit rate MS3 moves fast so that it causes inter-cell (micro-cell) handover too frequently, thus causing undesired signalling load to the system. Then it is handed over to the overlying macro cell A in order to decrease the signalling load due to the frequent handover execution. In this case the bit rate criterion may be used to ensure that the minimum bit rate can be provided by the macro cell A too. Alternatively, if there is a traffic reason handover in question and the entire bit rate cannot be supported via micro cell D because of radio resource scarcity, MS3 may be handed over to the neighbouring cell (e.g macro cell A). Moreover, the bit rate criterion can be used as a basis for providing partial loading approach. This means that the load of the home cell may be partially decreased according to the predefined handover profile in order to hand the mobile over to the macro-cell. Thus the blocking of the ongoing call can be avoided at the cost of the bit rate.

Still as another example, let us assume that a high speed mobile station MS2 is camping at the micro cell (B) and has a high bit rate radio connection via this cell. If the handover decision is made on the basis of the mobile motion, it would be handed over to the macro cell A in order to decrease the handover signalling load. Nevertheless, taking into account the handover profile of the connection and the interference situation in the radio access or cell, it may still be kept at the micro cell level to ensure that the QoS of the connection in terms of bit rate is met.

When considering the bit rate reason handover, it is beneficial to take the overall traffic distribution and the provided capacity into account within the network's coverage. The coverage could be planned in such a way that the high bit rate capacity is focused on the areas where it is mostly demanded. As a result, the high bit rate connections can be handed over to these areas if applicable. The high bit rate sub-areas can be supported by more transmission means such as Downlink Shared Channel (DSCH) or High Speed Downlink Packet Access (HSDPA). Then by utilizing the BSH the high bit rate connections can be switched to the cells which support such transmission techniques.

It should be emphasized that the above-mentioned cases are meant to merely exemplify the BSH utilization and parameter designing and therefore the invention is not limited to the examples described.

Figure 4:
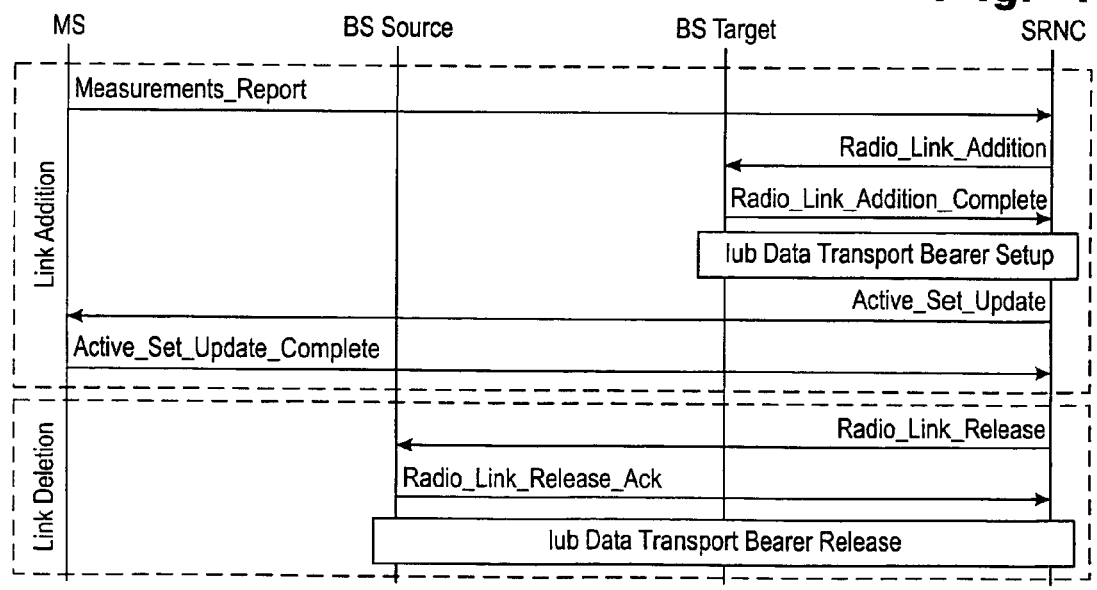

FIG. 4 illustrates a message sequence of an inter BS soft handover, where the original radio link provided by a BS is replaced with a new radio link provided by another BS controlled by the same Serving RNC. In practice, an inter BS radio link replacement procedure includes both radio link establishment and deletion. The illustrated example is based on a WCDMA system application. Nevertheless, the concept is not limited to this example and thus it can be applied to any cellular system.

An inter BS soft handover (branch replacement) procedure is started with Measurement_Report sending by the mobile station MS camping in the cell. This measurement report may also include information about the requested bit rate. On the basis of this information the MS (or connection) can be put into the appropriate class in the handover profile by the network. On the basis of that the SRNC decides to setup a radio link via a new BS and to delete the original one because it does not meet the predefined quality criteria (bit rate). The established and deleted radio links are under the control of the target and source BS, respectively. A source BS refers to the BS to which the MS already has a radio link. On the other hand, a target BS refers to the BS via which a new radio link is supposed to be established. At this stage, the SRNC may run the handover algorithm to evaluate whether handover should be executed or not, and if so, to which cell the connection should be linked. If handover should be executed then the SRNC sends a Radio_Link_Addition message over Iub interface to the target BS. If the requested resources are available, the target BS allocates resources and sends a Radio_Link_Addition_Complete to the SRNC. Upon reception of this message the SRNC initiates the setup of an Iub data transport bearer using transport protocols to the target BS. After that the target BS and the SRNC establish synchronization for the data transport bearers(s) related to the already existing radio link(s). Then target BS starts DL (downlink) transmission.

After a successful synchronization the SRNC sends an Active_Set_Update to the MS. In practice, by sending this message the SRNC informs the MS about the establishment of the new radio link via the target BS and about the deletion of the old radio link via the source BS. Then the MS deactivates DL reception via the old radio link of the source BS and activates the DL reception via the new radio link of the target BS. It further acknowledges the SRNC by sending an Active_Set_Update_Complete.

In addition to the SRNC requesting the source BS to deallocate radio resources by sending a Radio_Link_Release to the source BS. Upon that the BS releases the physical resources related to the old branch and sends a Radio_Link_Release_Ack to the SRNC, which in turn initiates the release of an Iub data transport bearer to the source BS by using the transport protocol.

It should be mentioned that inter BS handover can be a kind of hard handover, as is the case when, for instance, the BSs involved in the ongoing handover process are located under different RNCs and there is no Iur interface available between the RNCs to support the soft handover procedure.

The BSH can be used with all types of handover mechanisms, including hard, soft, softer, soft-softer, Mobile Evaluated Handover (MEHO: in which mobile runs the handover algorithm and only final acknowledgement is provided by the network), Network Evaluated Handover (NEHO: handover algorithm and decision-making is done at the network side) and Mobile Assisted Handover (MAHO: the mobile provides the needed assistance data when the handover algorithm is run and decision-making is done by the network).

The required parameters to be used with the handover process may be either defined in advance or dynamically during the network optimization process. The handover parameters, including handover profile vs cells, load classes vs cells, location assistance data, speed, signal strength, etc. can be maintained at the radio network database. This database may be connected to the radio network controller involved in a handover mechanism in order to be used when employing the handover algorithm.

When utilizing location assistance data in terms of mobile station's coordinates, speed and moving direction, for example, it is possible to define a regional specific pattern, which describes how the bit rate coverage is mapped to the location information. This means, for example, that sub-areas are defined within the coverage area of the system and preferable bit rates are defined for each sub-area. Based on such a pattern for example the high bit rate mobile stations can be efficiently handed over to a suitable high bit rate preferred sub-area, and low bit rate mobile stations can be handed over to a suitable low bit rate preferred sub-area. The sub-areas can be within a single cell, cluster of cells, location area, routing area, etc. When a single cell is concerned, it may mean that the cell area is divided into different, for example, co-centric sub-areas starting from the base station in the middle of the cell to the cell boundary. Specific preferred bit rate classes can be defined for each sub-area. For instance, those sub-areas, which are near the base station, are typically able to provide higher bit rates than those which are near the boundary of the cell.

It should be mentioned that the BSH may be executed between different radio access network types, for example IP RAN, UTRAN, WLAN (Wireless Local Area Network) and GERAN (GSM Enhanced Radio Access Network). The BSH can also be executed between cells implemented with different kinds of radio access techniques like CDMA, TDMA and FDMA. It should be also mentioned that the network elements mentioned in the examples above may have different names or functions in different systems and should therefore be understood as being descriptive rather than limiting. For example, in IP RAN the Radio network database is often called Common Resource Manager Server and many RNC functionalities are distributed to the base stations and Radio Network Access Server.

It will be obvious to a person skilled in the art that, as technology advances, the inventive concept can be implemented in various ways. The invention and its embodiments are not limited to the examples described above but may vary within the scope of the claims.

The invention claimed is:

1. A method for deciding on handover in a cellular communication system, comprising:
    collecting bit rate information related to a mobile station, when the mobile station is moving from a first cell to a second cell, wherein the mobile station initially has a connection to at least the first cell providing a certain bit rate to the mobile station, the collecting of the bit rate information comprising measuring the bit rate provided to the mobile station by the first cell and/or a bit rate provided to the mobile station by the second cell; and
    using the collected bit rate information for deciding on when handover of the mobile station from the first cell to the second cell should be carried out by triggering the mobile station handover from the first cell to the second cell when the bit rate provided by the first cell and/or the bit rate provided by the second cell fulfils a predetermined condition or predetermined conditions,
    wherein the bit rate is a transfer rate with which data is transmitted.

2. The method of claim 1, wherein the bit rate information comprises at least one of the following: the bit rate provided to the mobile station by the first cell, a bit rate provided to the mobile station by at least one other cell, or a bit rate requested by the mobile station.

3. The method of claim 1, wherein the decision on handover of the mobile station from the first cell to the second cell comprises deciding on whether handover should be carried out.

4. The method of claim 3, further comprising:
    defining a handover profile which defines a preferable cell or preferable cells for each bit rate, wherein the handover profile is used when deciding on handover of the mobile station.

5. The method of claim 1, wherein the decision on handover of the mobile station from the first cell to the second cell comprises deciding on to which cell handover of the mobile station should be made.

6. The method of claim 1, wherein information about traffic distribution in the system is utilized when deciding on handover of the mobile station.

7. The method of claim 1, wherein information about capacity provided by the system in different parts of the system is utilized when deciding on handover of the mobile station.

8. The method of claim 1, further comprising:
    defining sub-areas within the coverage area of the system; and
    defining preferable bit rates for each sub-area, wherein so defined sub-area information is used when deciding on handover of the mobile station.

9. The method of claim 1, wherein the predetermined condition requires that the bit rate is lower than a predetermined limit value, higher than a predetermined limit value or between two predetermined limit values.

10. The method of claim 9, wherein the limit value is, or limit values are based on the variation of the bit rate provided by the first cell and/or the bit rate provided by the second cell.

11. The method of claim 1, wherein the first cell and the second cell belong to different radio access systems or to the same radio access system.

12. A cellular communication system comprising:
    cells; and
    a mobile station having a connection to at least a first cell providing a certain bit rate to the mobile station; wherein the system is configured to when the mobile station is moving from the first cell to a second cell:

collect bit rate information related to the mobile station by measuring the bit rate provided to the mobile station by the first cell and/or a bit rate provided to the mobile station by the second cell; and use the collected bit rate information to decide on when mobile station handover from the first cell to the second cell should be carried out by triggering the execution of handover of the mobile station from the first cell to the second cell when the bit rate provided by the first cell and/or the bit rate provided by the second cell fulfils a predetermined condition or predetermined conditions, wherein the bit rate is a transfer rate with which data is transmitted.

13. The cellular communication system of claim 12, wherein the bit rate information comprises at least one of the following: the bit rate provided to the mobile station by the first cell, a bit rate provided to the mobile station by at least one second cell, or a bit rate requested by the mobile station.

14. The cellular communication system of claim 12, wherein the system is further configured, when deciding on handover of the mobile station from the first cell to the second cell, to decide on whether handover should be carried out.

15. The cellular communication system of claim 14, wherein the system comprises:

a handover profile comprising definitions of a preferable cell or preferable cells for each bit rate whereby the system is further configured to use the handover profile when deciding on handover of the mobile station.

16. The cellular communication system of claim 12, wherein the system is further configured, when deciding on handover of the mobile station from the first cell to the second cell, to decide on to which cell handover of the mobile station should be carried out.

17. The cellular communication system of claim 12, wherein the system is further configured to utilize information about traffic distribution in the system when deciding on handover of the mobile station.

18. The cellular communication system of claim 12, wherein the system is further configured to utilize information about capacity provided by the system in different parts of the system when deciding on handover of the mobile station.

19. The cellular communication system of claim 12, wherein the system is further configured to define sub-areas within the coverage area of the system and preferable bit rates for each sub-area, whereby the system is configured to use so defined sub-area information when deciding on handover of the mobile station.

20. The cellular communication system of claim 12, wherein the predetermined condition requires that the bit rate is lower than a predetermined limit value, higher than a pre-determined limit value or between two pre-determined limit values.

21. The cellular communication system of claim 20, wherein the limit value is, or limit values are based on the variation of the bit rate provided by the first cell and/or the bit rate provided by the second cell.

22. The cellular communication system of claim 12, wherein the first cell and the second cell belong to different radio access systems or to the same radio access system.

23. An apparatus, comprising:

a collector configured to collect bit rate information related to a mobile station in a cellular communication system when the mobile station is having a connection to at least a first cell providing a certain bit rate to the mobile station and when the mobile station is moving from the first cell to a second cell, by measuring the bit rate provided to the mobile station by the first cell and/or a bit rate provided to the mobile station by the second cell, and a decider configured to use the collected bit rate information for deciding on when handover of the mobile station from the first cell to the second cell should be carried out by triggering the execution of handover of the mobile station from the first cell to the second cell when the bit rate provided by the first cell and/or the bit rate provided by the second cell fulfils a predetermined condition or predetermined conditions, wherein the bit rate is a transfer rate with which data is transmitted.

24. The apparatus of claim 23, wherein the bit rate information comprises at least one of the following: the bit rate provided to the mobile station by the first cell, a bit rate provided to the mobile station by at least one second cell, a bit rate requested by the mobile station.

25. The apparatus of claim 23, wherein the apparatus is further configured, when deciding on handover of the mobile station from the first cell to the second cell, to decide on whether handover should be carried out.

26. The apparatus of claim 25, wherein the apparatus comprises a handover profile comprising definitions of a preferable cell or preferable cells for each bit rate whereby the system element is further configured to use the handover profile when deciding on handover of the mobile station.

27. The apparatus of claim 23, wherein the apparatus is further configured, when deciding on handover of the mobile station from the first cell to the second cell, to decide on to which cell handover of the mobile station should be carried out.

28. The apparatus of claim 23, wherein the apparatus is further configured to utilize information about traffic distribution in the system when deciding on handover of the mobile station.

29. The apparatus of claim 23, wherein the apparatus is further configured to utilize information about capacity provided by the system in different parts of the system when deciding on handover of the mobile station.

30. The apparatus of claim 23, wherein the apparatus is further configured to define sub-areas within the coverage area of the system and preferable bit rates for each sub-area, wherein the apparatus is configured to use so defined sub-area information when deciding on handover of the mobile station.

31. The apparatus of claim 23, wherein the predetermined condition requires that the bit rate is lower than a predetermined limit value, higher than a predetermined limit value or between two predetermined limit values.

32. The apparatus of claim 31, wherein the limit is, or limit values are based on the variation of the bit rate provided by the first cell and/or the bit rate provided by the second cell.

33. The apparatus of claim 23, wherein the apparatus is a radio network controller.

34. The apparatus of claim 23, wherein the apparatus is the mobile station.

35. The apparatus of claim 23, wherein the first cell and the second cell belong to different radio access systems or to the same radio access system.

36. A system element for controlling handovers in a cellular communication system comprising cells and a mobile station having a connection to at least a first cell providing a certain bit rate to the mobile station, wherein the system element is configured to when the mobile station is moving from the first cell to a second cell:

collect bit rate information related to the mobile station by measuring the bit rate provided to the mobile station by the first cell and/or a bit rate provided to the mobile station by the second cell, -and use the collected bit rate information for deciding on when handover of the mobile station from the first cell to the second cell should be carried out by triggering the execution of handover of the mobile station from the first cell to the second cell when the bit rate provided by the first cell and/or the bit rate provided by the second cell fulfils a predetermined condition or predetermined conditions, wherein the bit rate is a transfer rate with which data is transmitted.

37. A mobile station for use in a cellular communication system comprising cells, the mobile station being configured to:

collect bit rate information related to the mobile station by measuring, when the mobile station has a connection to at least a first cell, a bit rate provided to the mobile station by the first cell and/or a bit rate provided to the mobile station by a second cell; and use the collected bit rate information to decide on when handover of the mobile station from a first cell to the second cell should be carried out by triggering the execution of handover of the mobile station from the first cell to the second cell when the bit rate provided by the first cell and/or the bit rate provided by the second cell fulfils a predetermined condition or predetermined conditions, wherein the bit rate is a transfer rate with which data is transmitted.

38. A method for deciding on handover in a cellular communication system, comprising:

collecting bit rate information related to a mobile station, the collecting comprising measuring a bit rate provided to the mobile station by a first cell and/or a bit rate provided to the mobile station by a second cell; and using the collected bit rate information for deciding on handover of the mobile station from the first cell to the second cell, the deciding comprising deciding to perform the mobile station handover from the first cell to the second cell when the bit rate provided by the first cell and/or the bit rate provided by the second cell fulfils a predetermined condition or predetermined conditions, wherein the mobile station initially has a connection to at least the first cell providing a certain bit rate to the mobile station, wherein the bit rate is a transfer rate with which data is transmitted.

39. A cellular communication system comprising:
cells; and
a mobile station; wherein the system is configured to
collect bit rate information related to the mobile station by measuring a bit rate provided to the mobile station by a first cell and/or a bit rate provided to the mobile station by a second cell; and use the collected bit rate information for deciding on mobile station handover from the first cell to the second cell such that the system is configured to decide to trigger the execution of handover of the mobile station from the first cell to the second cell when the bit rate provided by the first cell and/or the bit rate provided by the second cell fulfils a predetermined condition or predetermined conditions, wherein the bit rate is a transfer rate with which data is transmitted.

40. A system element for controlling handovers in a cellular communication system comprising cells and a mobile station, wherein the system element is configured to:

collect bit rate information related to the mobile station by measuring a bit rate provided to the mobile station by a first cell or, a bit rate provided to the mobile station by a second cell, or a bit rate provided to the mobile station by a first and a bit rate provided to the mobile station by a second cell; and use the collected bit rate information for deciding on handover of the mobile station from the first cell to the second cell such that the system element is configured to decide to trigger the execution of handover of the mobile station from the first cell to the second cell when the bit rate provided by the first cell and/or the bit rate provided by the second cell fulfils a predetermined condition or predetermined conditions, wherein the bit rate is a transfer rate with which data is transmitted.

41. A mobile station for use in a cellular communication system comprising cells, the mobile station being configured to collect bit rate information related to the mobile station by measuring a bit rate provided to the mobile station by a first cell and/or a bit rate provided to the mobile station by a second cell; and use the collected bit rate information for deciding on handover of the mobile station from the first cell to the second cell such that the mobile station is configured to decide to trigger the execution of handover of the mobile station from the first cell to the second cell when the bit rate provided by the first cell and/or the bit rate provided by the second cell fulfils a predetermined condition or predetermined conditions, wherein the bit rate is a transfer rate with which data is transmitted.

42. A system for deciding on handover in a cellular communication system, comprising:

a collector configured to collect bit rate information related to a mobile station by measuring a bit rate provided to the mobile station by a first cell and/or a bit rate provided to the mobile station by a second cell; and a decider configured to decide on handover of the mobile station from the first cell to the second cell using the collected bit rate information by triggering the execution of handover of the mobile station from the first cell to the second cell when the bit rate provided by the first cell and/or the bit rate provided by the second cell fulfils a predetermined condition or predetermined conditions, wherein the bit rate is a transfer rate with which data is transmitted.

* * * * *